(12) United States Patent
Benson

(10) Patent No.: US 7,860,769 B2
(45) Date of Patent: Dec. 28, 2010

(54) METHOD OF PREVENTING FRAUD

(76) Inventor: Tracey M. Benson, 913 Pine Breeze Dr., Friendswood, TX (US)

( * ) Notice: Subject to any disclaimer, the term of this patent is extended or adjusted under 35 U.S.C. 154(b) by 0 days.

(21) Appl. No.: 11/460,002

(22) Filed: Jul. 26, 2006

(65) Prior Publication Data

US 2008/0027857 A1 Jan. 31, 2008

(51) Int. Cl.
G06Q 30/00 (2006.01)
(52) U.S. Cl. .................... 705/35; 705/36; 713/168; 713/182; 713/183; 713/185; 713/201; 713/202; 709/245; 370/389
(58) Field of Classification Search ............. 705/35, 705/36; 713/168, 182, 183, 201, 202, 185; 370/389; 340/5.28; 709/245
See application file for complete search history.

(56) References Cited

U.S. PATENT DOCUMENTS

| | | | |
|---|---|---|---|
| 6,985,608 | B2 | 1/2006 | Hoffman et al. |
| 6,993,658 | B1* | 1/2006 | Engberg et al. ............. 713/185 |
| 7,047,416 | B2 | 5/2006 | Wheeler |
| 7,099,957 | B2* | 8/2006 | Cheline et al. ............. 709/245 |
| 2003/0028481 | A1 | 2/2003 | Flitcroft |
| 2003/0061520 | A1* | 3/2003 | Zellers et al. ............... 713/202 |
| 2003/0070101 | A1 | 4/2003 | Buscemi |
| 2004/0177272 | A1* | 9/2004 | Walters ..................... 713/201 |
| 2004/0230538 | A1 | 11/2004 | Clifton |
| 2004/0243518 | A1 | 12/2004 | Clifton |
| 2005/0114673 | A1* | 5/2005 | Raikar et al. ............... 713/182 |
| 2005/0125686 | A1 | 6/2005 | Brandt |
| 2005/0154664 | A1* | 7/2005 | Guy et al. ..................... 705/35 |
| 2006/0041756 | A1* | 2/2006 | Ashok et al. ............... 713/183 |
| 2006/0069915 | A1* | 3/2006 | Koeda ......................... 713/168 |
| 2006/0083228 | A1* | 4/2006 | Ong et al. ................... 370/389 |
| 2007/0273474 | A1* | 11/2007 | Levine ...................... 340/5.28 |

FOREIGN PATENT DOCUMENTS

WO WO/2005/038572 A2 4/2005

* cited by examiner

*Primary Examiner*—Nga B. Nguyen
(74) *Attorney, Agent, or Firm*—Michael L. Greenberg, Esq.; Greenberg & Lieberman, LLC

(57) ABSTRACT

An identification verification system designed to prevent identity theft and financial fraud. Individuals are given or select identification codes which replace the commonly used social security numbers (SSNs). In order to access an individual's credit report or other financial records or open a credit account, the individual's identification code must be provided. Individuals, therefore, no longer have to provide their SSN in order to verify their identity. An individual's identity is verified only if the identification code submitted by the individual matches their identification code as found in a database. Individuals may choose to have their identification codes automatically changed periodically, or may choose to change their identification codes themselves as often as they wish. Identification codes are preferably changed upon each access to the individual's credit report or credit account opening.

2 Claims, 1 Drawing Sheet

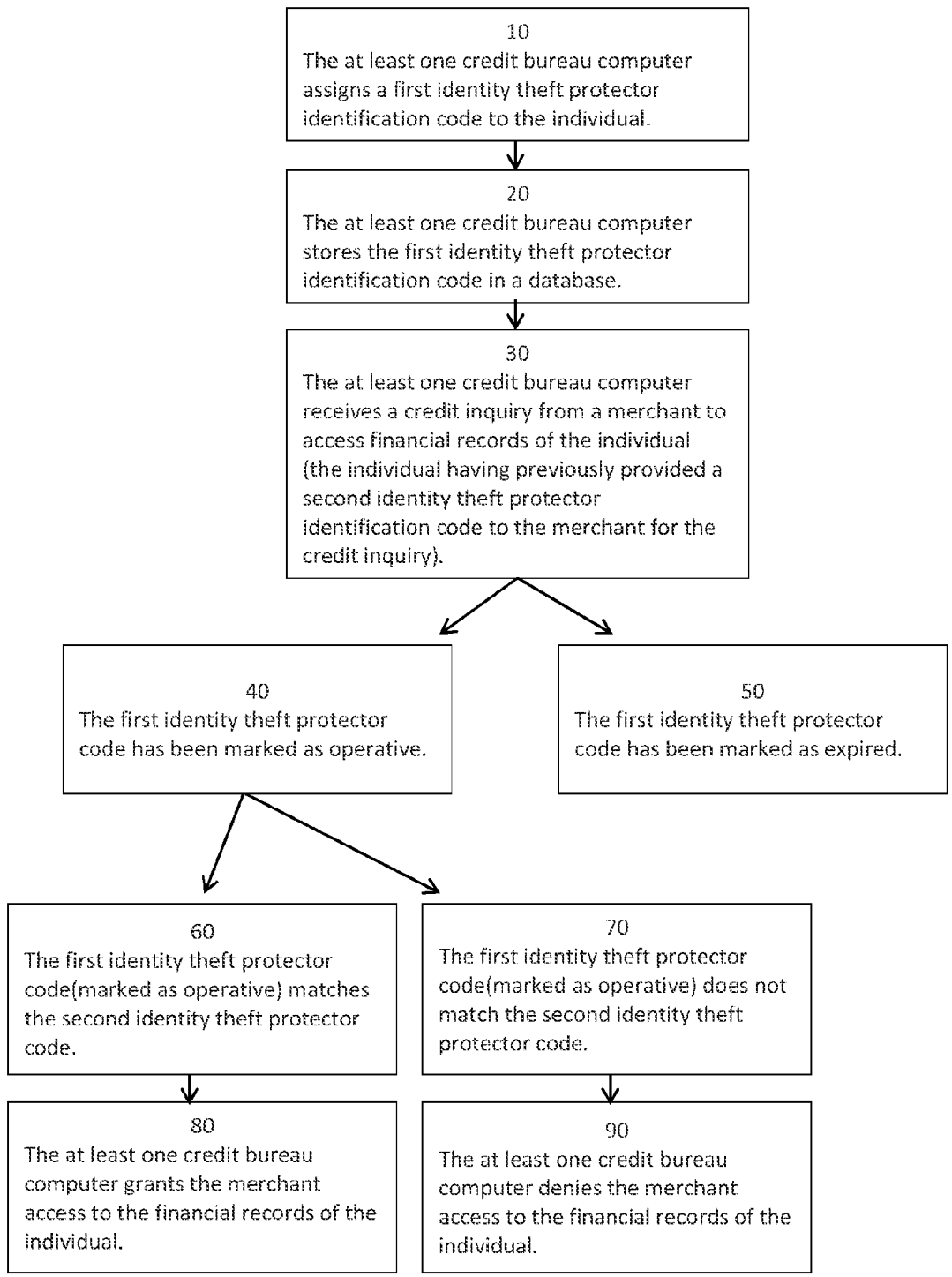

METHOD OF PREVENTING FRAUD

FIELD OF INVENTION

The present invention relates to information security and fraud-prevention. Specifically, the present invention concerns credit and identity theft prevention.

BACKGROUND OF THE INVENTION

Identity theft and fraud are substantial menaces to informational security in today's electronic age. Having one's identity stolen, or credit destroyed, can be life-destabilizing and can lead to literally years of agonizing phone calls, paperwork and attempts at reestablishing one's credibility. Moreover, victims of identity theft or financial fraud may suffer a permanent loss of peace of mind regarding financial matters, as well as in other areas of their life.

Identity theft and fraud are such life-shattering disasters because of the degree to which we depend on our credit. For example, when trying to secure a home or automotive loan, or when undergoing a background check for a job or condominium, one's credit is often carefully scrutinized. In fact, if one's credit is poor, home loans and high-end jobs can be all but off limits.

The situation is exacerbated by the fact that identity theft and fraud are nearly undetectable until they have occurred and begun to wreak havoc in one's life. That is, nearly no one is fortunate enough to catch an identity thief in the act of stealing one's identity or tampering with one's financial records. Only after bank account balances become inaccessible and credit cards are rejected do individuals realize that their identity has been stolen or misused.

In response to the threats of identity theft and financial fraud, banks and other financial institutions have created numerous security mechanisms to protect bank account and credit card information. For example, having a photograph of a credit card holder placed on their card, requiring online users to create usernames and passwords to access their online bank or credit card accounts, and providing transaction monitoring services have significantly enhanced financial security. One glaring chink in the armor of financial security, however, is one's credit report. Credit reports can be accessed using one's social security number (SSN)—and sometimes without any additional information. If a malicious individual obtains another's SSN, they have gained access to essentially all of that other person's financial information, including bank account and credit card numbers. Due to the pervasive use of SSNs in today's electronic age, one's SSN may be gleaned from, for example, cellular phone records, credit card statements, bank loan applications, housing documents, or employment forms. Once a malicious individual has seen obtained a victim's SSN, that individual may be able to take out a loan, make a purchase, or open a financial account in the victim's name.

The major credit bureaus, banks, and other entities that deal with financial transactions have tried several techniques to address the threats of identity theft and financial crimes. Often, accounts are protected with some sort of identifying feature. Institutions often require a password, SSN, date of birth, home address, or some other personal information before they are willing to grant access to an account. However, these security identifiers are only useful if they remain personal and unknown to potential perpetrators of identity theft. Therefore, it is critical that these security identifiers be protected and kept confidential. For example, if the password to an online credit card account is discovered by a potential identity thief, the identity thief might be granted full access to the account with the ability to purchase items upon its credit line. Obviously, there is no point to a password that can be obtained by thieves. Therefore, it is crucial that the means by which access is granted to these accounts be kept protected and private.

Security identifiers are used so often that a multitude of companies often posses this personal information about a person. Within each of these companies, numerous employees have access to this personal security information about a person. The risk that one of these people will misuse this information, or pass it along to someone that will misuse the information, is unfortunately not negligible. In addition, thieves target companies that possess this personal security information. By hacking into a computer system via the internet, or stealing laptops and other storage devices with personal information on them, thieves can gain access to consumers' account information and use it for their own benefit or sell it to the highest bidder. In addition, security identifiers such as one's SSN, address, and date of birth are often printed on materials that people carry around with them everyday. Simply losing one's wallet could produce dire consequences.

Even if security identifiers are kept private, one's account may not be entirely protected. If given unlimited opportunity, thieves may be able to simply guess or use a computer program to determine one's security identifier. One approach that has been used to combat this has been to disable a credit card or other account after someone has unsuccessfully tried to access it a certain number of consecutive times. For example, if an individual tried to use a credit card in an automated teller machine (ATM) several times in a row, but kept entering false personal identification (PIN) numbers, the credit card account may be frozen by the holder's bank. While this protects an account owner's assets and identity, it also is a great hassle for the account owner. In addition, legitimate users of the account, who may have forgotten which password, of several possible passwords, they used to protect the account, might also be locked out when they simply needed one more attempt to get the password right. Reactivating a disabled account takes both time and substantial effort. Often, a great deal of information and paperwork must be provided in order to reactivate a frozen account. Granted, the effort expended is not as great as it would have been had the thief been successful in their attempted fraud, but the effort is great nonetheless.

Financial institutions have also tried to combat identity theft and financial fraud by providing transaction monitoring services to customers. Such services, in their various forms, identify suspect transactions involving customers' financial accounts, and determine whether the transaction was legitimate or whether an investigation should be commenced. Such a service is retroactive, however, in the sense that it is powerless to prevent identity theft or financial fraud from occurring—at best, it can identify a wrongful transaction after it has taken place. Unfortunately for customers, nearly irreparable harm may be caused by the time such a system identifies a wrongful transaction. By that point, the customer may have faced the embarrassment of being denied a financial transaction, defaulted on loans, or even sunk into bankruptcy. Moreover, having to conduct an investigation into suspect transactions is an expensive and time consuming process, which, compared to a system of preventing wrongful transactions in the first place, is in the interests of neither financial institutions or customers.

In financial reports, such as one's credit report, the SSN is uniquely powerful. By simply providing this number, along with other readily obtainable information, such as one's address, it is possible to view one's entire financial history including account numbers and payment history. In reality, the SSN is the only line of defense against fraudulent access to one's credit report. This is a powerful ability that, if misused, could lead to fraudulent financial activity. As discussed above, one's credit report must be checked before one can secure a loan, purchase a house, etc. A third party is able to access an applicant's credit report when the applicant provides the third party with their SSN. Over the course of one's life, one could give such access to dozens upon dozens of third parties. The risk of abuse is great, as third parties might divulge one's SSN to potential thieves.

U.S. Pat. No. 6,985,608, issued to Hoffman, Pare and Lee on Jan. 10, 2006, is an identity verification method whereby an individual's personal identification number and a biometric sample are compared against their records in a database. A successful match signifies the authenticity of an individual's identity, and permits a transaction to proceed. Unlike the present invention, the invention of Hoffman, et al., does not replace an existing identifier, such as a SSN. Furthermore, by using a biometric sample as an integral component of its identification process, the invention of Hoffman, et al., does not provide for the easy alterability of identifiers that the present invention does. Additionally, unlike the present invention, the invention of Hoffman, et al., does not replace the SSN as a solitary identifier in accessing credit reports and other financial information.

U.S. Pat. No. 7,047,416, issued to Wheeler and Wheeler on May 16, 2006, is a user authentication method that uses a private identifier, a public identifier, and a digital signature. Once a user provides his private identifier and digital signature, the private identifier is checked against the public identifier to ensure authentication. Unlike the present invention, Wheeler and Wheeler's invention does not replace an existing identifier, such as a SSN. Moreover, Wheeler and Wheeler's invention contemplates using a physical "device" as an integral component of the authentication process, rather than relying on a purely numerical system, as the present invention does. Additionally, unlike the present invention, Wheeler and Wheeler's invention does not replace the SSN as a solitary identifier in accessing credit reports and other financial information.

U.S. Publication Number 2005/0125686 A1, published for Brandt on Jun. 9, 2005, is an individual verification system whereby a trusted third party provides the individual with primary and secondary identifiers, which, together with an identifier provided by the individual, are processed by an encryption key. The encryption key then produces an identifier for the individual, which may be varied by the individual. Unlike the present invention, Brandt's invention does not replace an existing identifier, such as a SSN. Moreover, unlike the present invention, Brandt's invention does not replace the SSN as a solitary identifier in accessing credit reports and other financial information.

U.S. Publication Number 2003/0028481 A1, published for Flitcroft and O'Donnell on Feb. 6, 2003, is a financial transaction system featuring limited use credit card numbers. Limitations on the use of such numbers may include particular merchants or merchant types, amount thresholds, or prior permission. Unlike the present invention, Flitcroft and O'Donnell's invention does not replace the SSN as a solitary identifier in accessing credit reports and other financial information. Furthermore, it does not provide increased protection against wrongful access of credit reports and other financial information.

U.S. Publication Number 2004/0243518 A1, published for Clifton and Guagliardo on Dec. 2, 2004, is an individual authentication system whereby a user provides a SSN and a personal identification number, which are crosschecked in a database. Unlike the present invention, Clifton and Guagliardo's invention does not replace the SSN as a solitary identifier in accessing credit reports and other financial information. Instead, it requires the individual to retain and use an additional number that is used in conjunction with the SSN. Furthermore, Clifton and Guagliardo's invention does not provide for periodic or customizable alterability of the identifier, as the present invention does.

U.S. Publication Number 2004/0230538 A1, published for Clifton and Guagliardo on Nov. 18, 2004, is an authentication method for accessing a credit report whereby financial institutions and their employees are each provided with identifiers, as are account holders. When an employee provides his identifier, the identifier of the financial institution (his employer), the individual's identifier, and the individual's SSN, the individual's credit report becomes available if all the numbers correspond in a $3^{rd}$ party's database. Unlike the present invention, Clifton and Guagliardo's invention does not replace the SSN as a solitary identifier in accessing credit reports and other financial information. Furthermore, Clifton and Guagliardo's invention does not provide for periodic or customizable alterability of the identifier, as the present invention does.

U.S. Publication Number 2003/0070101 A1, published for Buscemi on Apr. 10, 2003, is an individual verification method whereby an individual submits his personal identifier along with his SSN to a third party, who checks those data against a database. If the submitted personal identifier and SSN match, the individual's identity is thereby successfully verified. Buscemi's invention also provides for alterability of the individual's identifier. Unlike the present invention, Buscemi's invention does not replace an existing identifier, such as a SSN; it simply provides an additional identifier which corresponds to the individual's SSN. Moreover, unlike the present invention, Buscemi's invention does not replace the SSN as a solitary identifier in accessing credit reports and other financial information. The present invention, on the other hand, eliminates the need for the individual to provide his SSN in order to access his financial records.

W.O. Publication Number 2005/038572 A2, published for Sorrentino on Apr. 28, 2005, is an individual authentication system whereby an individual's credit card contains an account number and a security identifier. Once an individual presents the card, together with a secondary identifier, his identity may be verified. Unlike the present invention, Sorrentino's invention does not replace the SSN as a solitary identifier in accessing credit reports and other financial information. Furthermore, Sorrentino's invention does not provide for periodic or customizable alterability of the identifier, as the present invention does.

Therefore, there is a need for a method of securely accessing credit reports and other financial information that does not rely on the uniquely powerful, yet dangerous, capabilities of the SSN. Such a system must provide a replacement for the SSN which, unlike the SSN, is limitlessly changeable in order to elude potential identity thieves. In essence, a system is needed that provides the simple and effective identification power of a SSN without the security pitfalls SSNs entail. Moreover, there is a need for a method of preventing credit accounts from being opened in a user's name without the user's permission. The SSN is no longer a safe way to allow credit to be opened and used.

SUMMARY OF THE INVENTION

The present invention is a method whereby an individual uses an Identity Theft Protector Identification Code (ITPIC) in the same manner a SSN is currently used. Instead of requiring an individual's SSN to, for example, access his credit report or open a new account, the ITPIC will provide such access. The ITPIC will essentially replace the SSN as the primary identifier for individuals in various financial documentation and records. Unlike a SSN, however, the ITPIC may be changed regularly or according to the desires of the individual.

The present invention prevents an identity thief from using a victim's SSN to access the victim's private financial information through the victim's credit report. Further, the present invention prevents and identity thief from using a victim's SSN to open accounts in the victim's name. Instead of simply providing the victim's SSN to view the victim's credit report or open a new account, an identity thief will have to provide the victim's ITPIC. Because the ITPIC is continuously alterable by it's rightful possessor, an identity thief may be thwarted if they obtain an old and expired ITPIC. For example, if the ITPIC is changed (automatically or by the user) after each transaction in which it is provided, even a thief with access to all of the documentation for those transactions will be unable to steal or misuse that individual's identity. Moreover, identity theft and financial fraud may be effectively investigated by looking into the usage of old and expired ITPICs. To prevent a potential identity thief from requesting a new ITPIC to be issued to them, in the victim's name, the process by which ITPICs shall be issued should be particularly scrutinizing.

BRIEF DESCRIPTION OF THE DRAWINGS

FIG. 1 shows a flowchart of the present invention.

DETAILED DESCRIPTION

In its preferred embodiment, shown in FIG. 1, the present invention requires that individuals be assigned, or choose, an Identity Theft Protector Identification Code (ITPIC) (10). Such a code may consist of letters, numbers, or a combination thereof. The ITPIC will serve as an identification number for the individual, much as a Social Security Number (SSN) currently does. The ITPIC could contain at least six characters, and may contain as many characters as are deemed necessary to provide a sufficiently low likelihood of multiple individuals sharing the same code, or of codes being determinable by illicit means.

It is preferred that the ITPIC have as least nine characters because the average consumer might never reach ten credit inquiries/account openings per year. Nevertheless, if the ITPIC is to change upon each use, then there need to be enough permutations to allow new ITPIC's to be assigned. In theory, of course, the ITPIC can be as many characters as necessary to provide adequate permutations so only one ITPIC is used per credit inquiry or account opening. Should ITPIC's be reused, then fraud tracking will not be very possible because an incidence of fraud will be associated with the particular ITPIC that was provided to a particular third party. For example, should a consumer provide an ITPIC to an automobile dealer to do a credit check, and then later, a fraudulent account is opened in the consumer's name and exercise equipment is purchased with the fraudulent account, if the ITPIC used to open the fraudulent account matches the ITPIC provided to the automobile dealer, then the source of the fraud would be easily tracked to the automobile dealer. Theft prevention would have been nearly achieved—or at least knowing that the fraud is trackable, the automobile dealer would be inclined to ensure that fraud does not occur.

Preferably, individuals will be able to have their ITPIC automatically changed periodically. For example, an individual may wish to have their ITPIC change weekly, monthly, yearly, or according to another interval. Additionally, individuals will have the option to change their ITPIC on their request.

Also in the preferred embodiment of the present invention, individuals' ITPICs will be stored in a secure database (20). The database will contain all currently operative ITPICs, as well as all expired ITPICs for purposes of documentation and investigations into identity theft and financial fraud. All ITPICs will be marked in the database as operative (40) or expired (50), and only operative ITPICs shall provide a means for the individual possessing it to verify his identity.

When an individual's ITPIC changes, either automatically or by the individual's choice, such change will be reflected in the secure database. The secure database will serve as a central information source for the credit bureaus, such that when an individual's ITPIC changes, the credit bureaus will be apprised of such change from the database, or a representative thereof. Consequently, consistency among the credit bureaus, and between them and the secure database, will be preserved. Once an individual's ITPIC changes, his prior ITPIC shall be marked as expired, and his new ITPIC shall be marked as operative.

In the preferred embodiment of the present invention, an individual's identity will be verified as follows. The individual, or a third party, will seek access to the individual's financial records (30). The individual or third party will be required to present, alone, or in conjunction with other identifying information, his ITPIC. The ITPIC thus presented will then be searched for in the secure database. If an ITPIC is found in the database that matches the ITPIC presented (60), the individual's identity may be verified. If only the ITPIC was requested to identify the individual, the identification process will be complete, and the individual will be positively identified. If other information was requested in conjunction with the ITPIC, such other information will be verified only if a match is found in the database for the ITPIC provided. If, then, the other information provided by the individual is verified, the individual will be positively identified. Once an individual is positively identified, access to the individual's financial records being sought will be granted (80). If, either because the individual's ITPIC was unsuccessfully matched (70), or other identifying information was found to be erroneous, the individual is not positively identified, access to the individual's financial records will be denied (90).

To further explicate the above identification process, the following example may provide clarification. An individual may seek to apply for employment. In the application documentation, the individual would ordinarily be requested to provide, among other things, his SSN. Under the framework of the present invention, however, the individual will be requested to provide his ITPIC in place of his SSN. If the potential employer wanted to perform a credit check of the individual, he would then submit the ITPIC provided by the individual to a credit bureau. The credit bureau would grant the potential employer access to the individual's credit report only if the provided ITPIC matched an ITPIC in a secure database of ITPICs. If the provided ITPIC did not match an ITPIC in the secure database, the potential employer would be denied access to the individual's credit report. This example can also be extended to opening a credit account in the individuals name.

If one replaces the potential employer in the above example with a prospective identity thief, the benefits of the present invention may be readily seen. Ordinarily, if a prospective identity thief learned an individual's SSN, he would have virtually free access to the individual's credit report. Under the framework of the present invention, however, where a limitlessly variable ITPIC replaces the SSN as an identifier, the prospective identity thief would be thwarted if he tried to use an ITPIC that had been subsequently changed.

Truly, the simplicity of establishing credit in an individual's name merely by having that invidivual's SSN and name or address, etc. calls for establishment of a system devoid of SSN to remove the burden of identity theft from the consumer—the consumer bearing a heavy burden should identity theft occur currently.

Preferably, the method by which individuals may personally change or gain access to their ITPICs (as opposed to having their ITPICs automatically change) will be particularly scrutinizing. If individuals were able to change their ITPICs without a very rigorous identification process, the security enhancements of the present invention may be undone. Identity thieves cannot be allowed to provide a few trivial pieces of information about an individual and gain access to or change the individual's ITPIC. Therefore, in order to change or gain access to an individual's ITPIC, a sufficiently high amount of identifying information must be provided by the individual. In the same vein, it should be noted that the means by which individuals will receive new ITPICs that are automatically generated will be particularly secure. Allowing new ITPICs to be intercepted or observed by potential identity thieves would be just as dangerous as allowing identity thieves to gain access to or change an individual's ITPIC.

In an alternative embodiment of the present invention, a mathematical formula may be used to generate new ITPICs for individuals. Use of such a formula would provide increased unpredictability in ITPICs that individuals may choose, which would make it more difficult to illicitly determine an individual's ITPIC.

In an alternative embodiment of the present invention, when an expired ITPIC is used in an attempt to verify an individual's identity, an alert may be generated. Such an alert may signify that potential identity theft is underway. Determining, with existing technology, the location, timing and other pertinent circumstances surrounding such use may be prompt or assist investigations into identity theft or financial fraud. Because it is surely possible that the use of an expired ITPIC may be innocent—e.g., caused by a forgetful individual—care must be taken in determining whether such use is actually wrongful. If ITPIC's are changed each time a credit inquiry or credit account is opened, then a particular activity by a particular party can be isolated per credit inquiry or credit account opening—and if an individual provided their ITPIC to a party, then that party will be known as the party that initiated a particular credit inquiry or credit account opening.

In an alternative embodiment of the present invention, individuals may be provided limitless ways determine how and when their ITPIC is changed. One such way may be to automatically change an individual's ITPIC after each successful use. Doing so would thwart even an identity thief with access to the documentation of such uses. For example, if a landlord who legitimately accessed an individual's credit report decided to view the individual's credit report a second time using the same ITPIC, he may be denied from doing so.

As an alternative embodiment of the present invention, the secure database containing ITPICs may be owned and operated by a new credit bureau in competition with the existing credit bureaus. In such an embodiment, use of the present invention's identification method will provide a decisive competitive advantage in terms of providing security and reliability in its services. If it so chose, such a new credit bureau may license or freely permit its competitors access to its secure database of ITPICs.

Identification codes are preferably changed upon each access to the individual's credit report or credit account opening. In a further embodiment of the present invention, an ITPIC would remain valid until used, so that if an ITPIC is provided to car dealer to check credit for a potential purchase, for example, then that ITPIC would be capable of being used one time only even though another ITPIC had been issued because that ITPIC had been provided to someone. This is important because the car dealer might not perform the credit check for a day or so, and in the meanwhile, the individual would want to be able to provide another different ITPIC to another party. In embodiments, the ITPIC would be associated directly with the party to whom it is provided. The individual, for example, could enter the party to whom the ITPIC has been provided into software or a list. Thus, if an ITPIC provided to a party is not used for two years, and then suddenly that ITPIC is used for opening an account or some other credit access that is no longer desired by the individual, the particular ITPIC used would be directly traceable to the party that used it because only that ITPIC was provided to the party.

It is understood that the present invention is not solely limited to the invention as described in the embodiments above, but further comprises any and all embodiments within the scope of the following claims.

I claim:

1. A method whereby the identity of an individual or entity is verified, comprising:

at least one credit bureau computer assigning a first identity theft protector identification code to the individual, the first identity theft protector identification code replacing the social security number of the individual;

the at least one credit bureau computer storing the first identity theft protector identification code in a database;

the at least one credit bureau computer marking the first identity theft protector identification code as one of the following: operative, expired;

the at least one credit bureau computer receiving a credit inquiry from a merchant to access financial records of the individual, the individual having provided a second identity theft protector identification code to the merchant for the credit inquiry; and the at least one credit bureau computer providing access to the merchant to the financial records of the individual when the first identity theft protector identification code has been marked as operative and matches the second identity theft protector identification code.

2. The method of claim 1, further comprising the at least one credit bureau computer denying access to the financial records of the individual when the second identity theft protector identification code does not match the first identity theft protector identification code that has been marked as operative in the database.

* * * * *